(No Model.)
J. A. PACK.
SEED PLANTER.
No. 355,836. Patented Jan. 11, 1887.
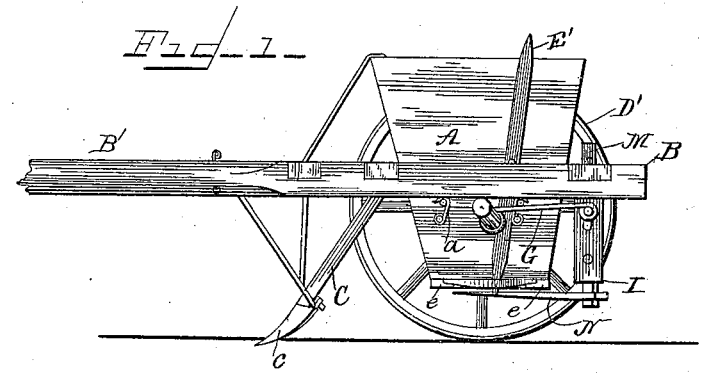
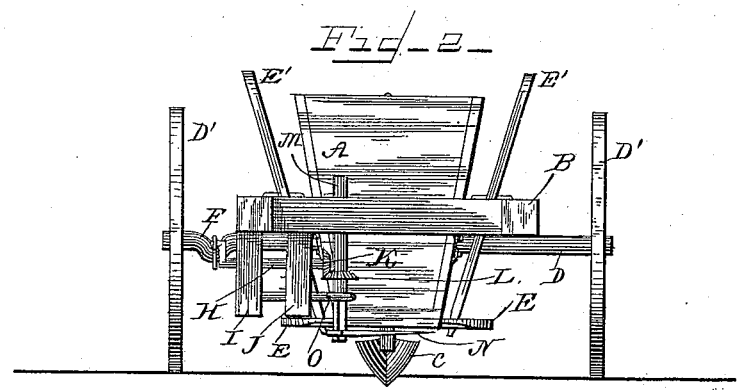
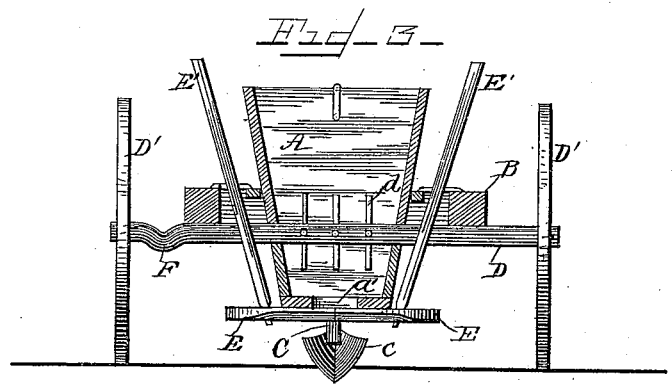
Witnesses
R. W. Bishop
A. S. Bishop
Inventor
John A. Pack,
By his Attorney
H. F. Ennis.
N. PETERS. Photo-Lithographer, Washington, D. C.

UNITED STATES PATENT OFFICE.

JOHN A. PACK, OF SPROTTS, ALABAMA.

SEED-PLANTER.

SPECIFICATION forming part of Letters Patent No. 355,836, dated January 11, 1887.

Application filed October 8, 1886. Serial No. 215,676. (No model.)

*To all whom it may concern:*

Be it known that I, JOHN A. PACK, a citizen of the United States, residing at Sprotts, in the county of Perry and State of Alabama, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in seed-planters and fertilizer-distributers; and it consists in certain novel features hereinafter fully set forth and claimed.

In the accompanying drawings, which fully illustrate my invention, Figure 1 is a side elevation with the near wheel removed. Fig. 2 is an end elevation, and Fig. 3 is a cross-sectional view of my improved planter.

Referring to the drawings by letter, A designates the hopper, which rests upon a frame, B, the side bars of which extend forward and form the shafts B'. A standard, C, depends from one of the front cross-beams of the frame B, and has a shovel or furrow-opener, c, secured to its lower end. This standard is suitably braced, as shown.

The hopper A is formed in two parts—an upper and a lower portion—the lower part being suspended from the upper by means of the hooks a. The axle D of the supporting and drive wheels D' passes through the hopper on the line of division of the same, and is provided with a series of fingers or stirrers, d, along that portion of its length which comes between the sides of the hopper, as shown in Fig. 3. The bottom of the hopper is provided with an opening, a', through which the seeds pass to the ground. To the under side of the bottom of the hopper, at the front and rear edges of the same, I secure guide-rails e, which support two cut-off slides, E. These slides are operated by means of the levers E', which run up on the opposite sides of the hopper, and are pivotally supported upon the frame B.

The axle D is bent near one end, so as to form the crank F, and a pitman, G, connects this crank with a crank on the outer end of a shaft, H, which is carried by two hangers, I J, depending from the rear cross-bar of the frame B. The inner end of this shaft H is provided with a cog-wheel, K, which meshes with a cog-wheel, L, on an upright shaft, M, the upper end of which is journaled in the rear cross-bar of the frame B, and the lower end of which is provided with a chopper, N.

O is a guide or eye carried by the hangers I J, which serves to keep the shaft M in its true vertical position.

The operation of my machine will be readily understood and appreciated. As the machine is run over the ground the wheels D' will transmit their motion to the axle D, as will be understood. The revolution of the axle D will cause the stirrers or fingers d to loosen the seeds in the hopper and allow the same to pass freely through the opening a' and between the slides E to the ground. The amount of seed allowed to pass out at one time is regulated by adjusting the slides E to and from each other by means of the levers E'. The revolution of the axle D will also give a reciprocating movement to the pitman G, connected to the crank portion F of said axle. This motion will be communicated to the crank on the end of the shaft H and cause the same to make a half-revolution at each stroke of the pitman, as will be understood. It will thus be seen that the shaft H has a vibratory motion, and this vibratory motion of the shaft H will be transmitted to the upright shaft M through the cog-wheels K L, and the chopper N, secured on the lower end of the shaft M, will thereby be vibrated, as will be readily understood, and consequently scatter the seed falling thereon, as well as cut or chop any large lumps of seed which may pass from the hopper.

Having thus described my invention, what I claim, and desire to secure by Letters Patent, is—

In a seed-planter, the combination, with the supporting-frame, of a hopper, a horizontally-vibrating seed chopper or scatterer working across and just below the discharge end of the hopper, and driving mechanism connecting the chopper with the main driving and supporting wheels, the hopper, chopper, and driving mechanism being carried by the main supporting-frame, substantially as specified.

In testimony whereof I affix my signature in presence of two witnesses.

JOHN A. PACK.

Witnesses:
J. K. WHITE,
JOSEPH S. PETTIT.